(12) United States Patent
Bondalakunta et al.

(10) Patent No.: US 9,857,979 B2
(45) Date of Patent: *Jan. 2, 2018

(54) OPTIMIZING PAGE BOUNDARY CROSSING IN SYSTEM MEMORY USING A REFERENCE BIT AND A CHANGE BIT

(71) Applicant: International Business Machines Corporation, Armonk, NY (US)

(72) Inventors: Asha Kiran Bondalakunta, Bangalore (IN); Raghavan Devanathan, Bangalore (IN); Muthulakshmi Pearl Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/949,969

(22) Filed: Nov. 24, 2015

(65) Prior Publication Data

US 2017/0147222 A1   May 25, 2017

(51) Int. Cl.
*G06F 3/06* (2006.01)

(52) U.S. Cl.
CPC ............ *G06F 3/0605* (2013.01); *G06F 3/061* (2013.01); *G06F 3/0644* (2013.01); *G06F 3/0658* (2013.01); *G06F 3/0673* (2013.01)

(58) Field of Classification Search
CPC ...... G06F 3/061; G06F 3/0611; G06F 3/0644; G06F 3/0667; G06F 12/12; G06F 12/126; G06F 2212/69
See application file for complete search history.

(56) References Cited

U.S. PATENT DOCUMENTS

| | | |
|---|---|---|
| 6,886,085 B1 | 4/2005 | Shuf et al. |
| 8,589,738 B2 | 11/2013 | Moyer et al. |
| 8,639,892 B1 | 1/2014 | Wilt |
| 8,719,541 B2 | 5/2014 | Murray et al. |
| 8,930,635 B2 | 1/2015 | Woffinden |
| 8,930,673 B2 | 1/2015 | Greiner et al. |
| 2003/0135789 A1 | 7/2003 | DeWitt et al. |
| 2005/0005080 A1 | 1/2005 | Dunshea et al. |

OTHER PUBLICATIONS

Accelerated Examination Support Document, U.S. Appl. No. 15/044,132, dated Feb. 12, 2016, 8 pages.
Bondalakunta et al., "Optimizing System Memory Usage," U.S. Appl. No. 15/044,132, filed Feb. 16, 2016.
List of IBM Patents or Patent Applications Treated as Related, signed Feb. 12, 2016, 2 pgs.

*Primary Examiner* — Hal Schnee
(74) *Attorney, Agent, or Firm* — Erik K. Johnson

(57) ABSTRACT

A computer determines whether a page boundary of a page has been crossed by a function. Based on the computer determining that the page boundary has been crossed by the function, the computer generates a hardware exception. The computer resets one or more of a change bit and a reference bit for the page.

18 Claims, 3 Drawing Sheets

OPTIMIZING PAGE BOUNDARY CROSSING IN SYSTEM MEMORY USING A REFERENCE BIT AND A CHANGE BIT

TECHNICAL FIELD

The present invention relates to system memory, and more particularly to optimizing the usage of system memory.

BACKGROUND

In today's day and age, the utilization of system memory is of the upmost importance. Efficiently utilizing system memory allows a user or company to get the most out of their system without suffering from lag or application errors due to excessive memory use. Furthermore, determining memory to reallocate and then subsequently reallocating the memory is a typical way in which a computing system frees up memory so that currently running applications can benefit from greater availability.

SUMMARY

The present invention provides a method, system, and computer program product for optimizing the usage of system memory. A computer determines whether a page boundary of a page has been crossed by a function. Based on the computer determining that the page boundary has been crossed by the function, the computer generates a hardware exception. The computer resets one or more of a change bit and a reference bit for the page.

DETAILED DESCRIPTION

Embodiments of the present invention will now be described in detail with reference to the accompanying Figures.

Figure 1:
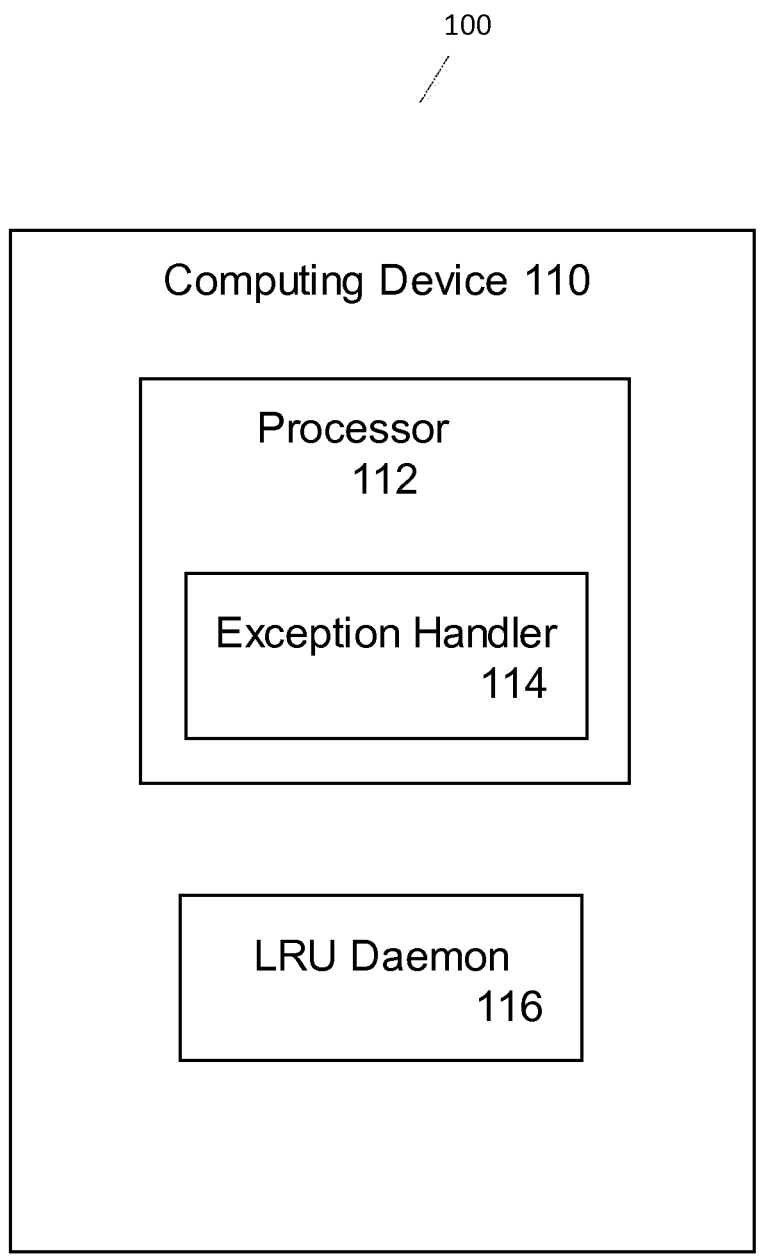
FIG. 1 illustrates a memory usage system, in accordance with an embodiment of the invention.

FIG. 1 illustrates memory usage system 100, in accordance with an embodiment of the invention. In an exemplary embodiment, memory usage system 100 includes computing device 110.

Computing device 110 includes processor 112 and LRU (least recently used) Daemon 116. Computing device 110 may be a desktop computer, a notebook, a laptop computer, a tablet computer, a handheld device, a smart-phone, a thin client, or any other electronic device or computing system capable of receiving and sending data to and from other computing devices via a network. Although not shown, optionally, computing device 110 can comprise a cluster of web devices executing the same software to collectively process requests. Computing device 110 is described in more detail with reference to FIG. 3.

LRU Daemon 116 is a software application capable of determining the pages within system memory that are the "least recently used". In the example embodiment, LRU Daemon 116 checks the reference bit and the change bit associated with each page in order to determine if the page has been referenced or has been changed. Typically, if LRU Daemon 116 determines that the change bit or reference bit has been set (the page has been changed or referenced), LRU Daemon 116 identifies that the page must be swapped-out by processor 112 into the swap space of system memory because the operating system does not want to lose the changes that were made to the page. Once processor 112 has re-allocated the page to be utilized by a function, the page must then be swapped back in.

In the example embodiment, processor 112 includes exception handler 114. Processor 112 is hardware capable of executing instructions of a program/application on computing device 110. Furthermore, in the example embodiment, processor 112 is capable of determining whether a page boundary has been crossed during the execution of a function, and based on the determination generating a hardware exception, and transferring control to exception handler 114. In the example embodiment, exception handler 114 is hardware (part of processor 112) capable of resetting the reference and change bits for a page based on control being transferred over by processor 112. In another embodiment, exception handler 114 may also be firmware or a software application. The operations and functions of processor 112 and exception handler 114 are described in more detail with reference to FIG. 2.

Figure 2:
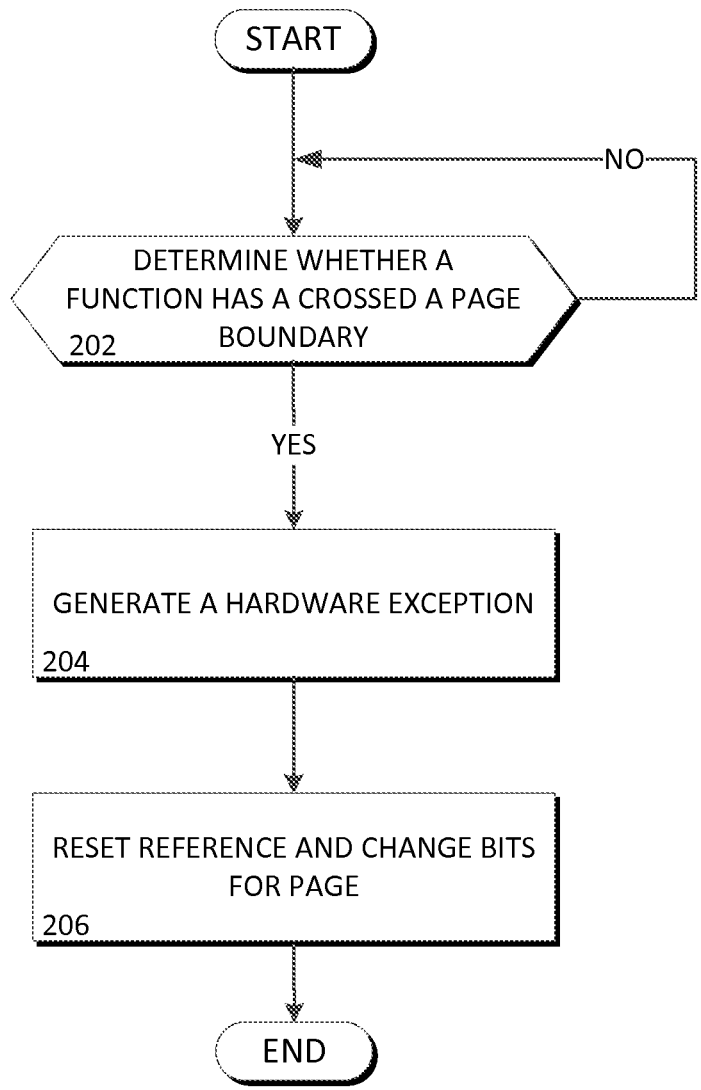
FIG. 2 is a flowchart illustrating the operations of the processor of FIG. 1 in optimizing the usage of system memory by reducing swap-in and swap-out time of unused stack pages, in accordance with an embodiment of the invention.

FIG. 2 is a flowchart illustrating the operations of processor 112 in determining whether a page boundary has been crossed during the execution of a function, in accordance with an embodiment of the invention. In the example embodiment, a page within physical memory are associated with a change bit and a reference bit. If LRU Daemon 116 determines that the change bit for a page has been set (has a value of 1), the LRU Daemon 116 identifies that the associated page has been recently changed (for example, the page has been written to). If LRU Daemon 116 determines that the reference bit for a page has been set (has a value of 1), the LRU Daemon 116 identifies that the associated page has been recently referenced. In the example embodiment, LRU Daemon 116 may check a page every few seconds to determine whether either of the associated bits have been set.

In the example embodiment, processor 112 determines whether a function being executed on computing device 110 has crossed a page boundary (decision 202). In the example embodiment, processor 112 determines whether a function has crossed a page boundary by determining whether the function is executing an instruction that involves referencing or writing to a page that is different from the page referenced or written to by the previous instruction. For example, if an instruction (associated with a function) is executed by processor 112 and entails referencing a first page while the next instruction (for the function) entails referencing a second page, processor 112 determines that the function has crossed a page boundary. If processor 112 determines that a function has not crossed a page boundary (decision 202, "NO" branch), processor 112 continues to monitor for any function on computing device 110 that has crossed a page boundary.

If processor 112 determines that a function has crossed a page boundary (decision 202, "YES" branch), processor 112 generates a hardware exception (step 204). In the example embodiment, the generation of the hardware exception by processor 112 transfers control of execution of the function to exception handler 114. In the example embodiment, exception handler 114 is a hardware component that is part of processor 112, however, in other embodiments, exception handler 114 may be firmware or a software application.

In the example embodiment, once processor 112 transfers control of execution of the function to exception handler 114, exception handler 114 resets the reference and change bit for the page whose boundary was crossed (step 206). For example, referring to the example above, if processor 112 determines that an instruction (for the function) entails referencing a first page while the next instruction (for the function) entails referencing a second page, processor 112 determines that the function has crossed the page boundary of the first page and has moved into the second page. Therefore, after the hardware exception is generated and control is transferred by processor 112 to exception handler 114, exception handler 114 resets the change bit and reference bit associated with the first page. By doing so, when LRU Daemon 116 performs checks to determine whether the change bit and/or reference bit has been set, LRU Daemon 116 does not determine that the change bit and/or reference bit associated with the first page has been set. Therefore, as stated above, LRU Daemon 116 does not identify the page as needing to be swapped-out to the swap space (and then subsequently swapped-in) at a later time, reducing swap-in and swap-out time and resulting in more efficient utilization of system memory.

In one embodiment, the method may be utilized solely with singleton pages, such as stack pages, due to stack pages being private to a function. Typically, even if there are 100 instances of a function running on a system, each function will have its own stack page.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
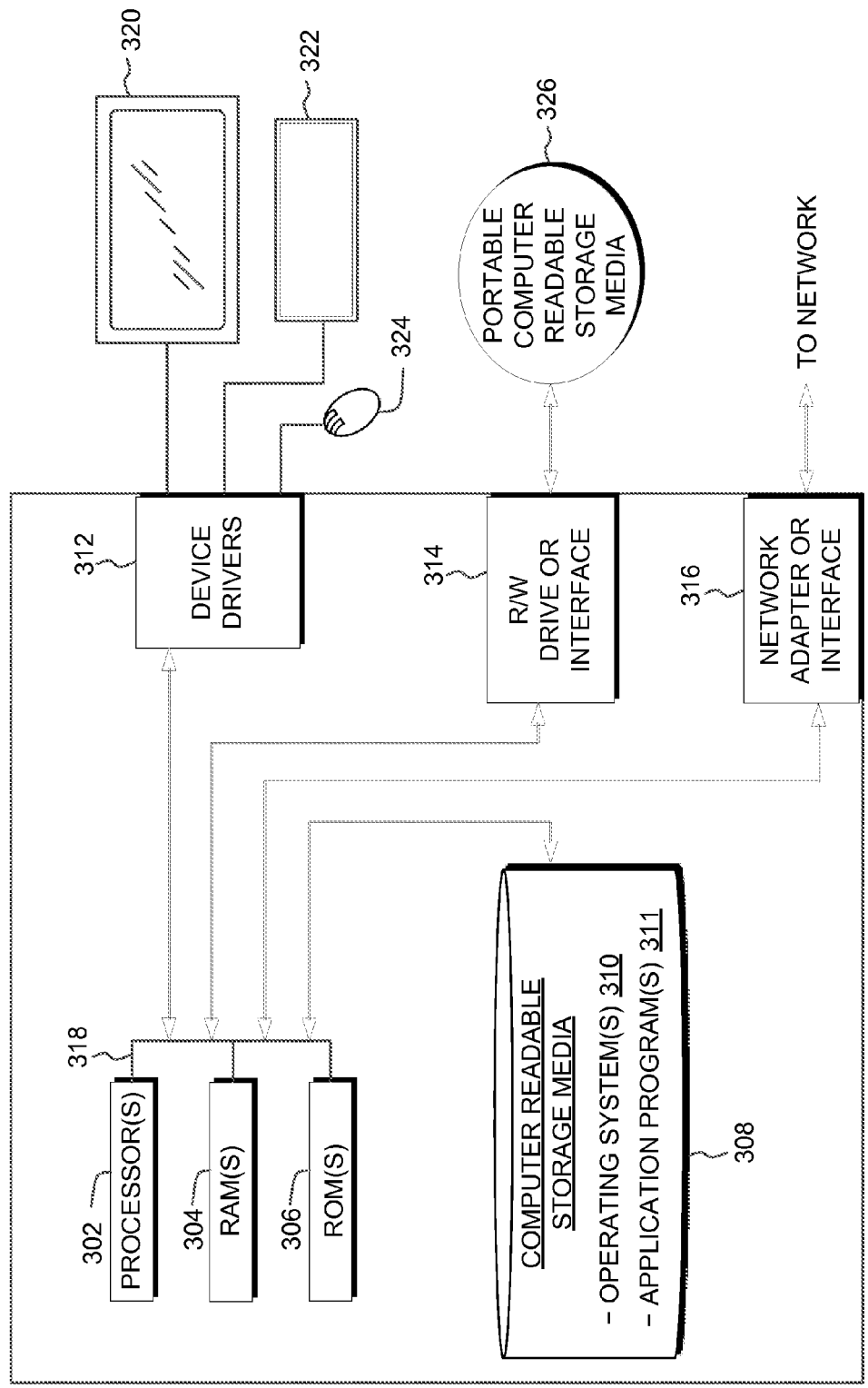
FIG. 3 is a block diagram depicting the hardware components of the memory usage system of FIG. 1, in accordance with an embodiment of the invention.

FIG. 3 depicts a block diagram of components of computing device 110 of memory usage system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, LRU Daemon 116, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing usage of system memory, comprising the steps of:
    determining, by a computer, whether a page boundary of a first page has been crossed by a function to a second page;
    based on determining that the page boundary has been crossed by the function, generating, by the computer, a hardware exception; and
    based on generating the hardware exception, resetting, by the computer, one or more of a change bit and a reference bit for the first page, wherein the reference bit, when set, indicates that the first page has been referenced; and wherein the change bit, when set, indicates that the first page has been written to, and wherein resetting the change bit and the reference bit prevents the first page from being swapped out of the system memory.

2. The method of claim 1, wherein determining whether the page boundary of the first page has been crossed by a function further comprises determining whether the function is executing an instruction that involves at least one function selected from the group consisting of referencing to another page and writing to another page.

3. The method of claim 2, wherein the first page and the second page are singleton pages.

4. The method of claim 1, wherein determining whether the page boundary of the first page has been crossed by a function further comprises determining whether at least one of a reference bit and a change bit associated with another page has been set.

5. The method of claim 1, wherein the computer generating a hardware exception further comprises the computer transferring control of execution to an exception handler.

6. The method of claim 1, further comprising:
based on the computer determining that the page boundary has not been crossed by the function, the computer monitoring execution of the function.

7. A computer program product for optimizing usage of system memory, the computer program product comprising:
one or more computer-readable storage devices and program instructions stored on at least one of the one or more computer-readable storage devices, the program instructions comprising:
program instructions to determine whether a page boundary of a first page has been crossed by a function to a second page;
based on determining that the page boundary has been crossed by the function, program instructions to generate a hardware exception; and
based on generating the hardware exception, program instructions to reset one or more of a change bit and a reference bit for the first page, wherein the reference bit, when set, indicates that the first page has been referenced; and wherein the change bit, when set, indicates that the first page has been written to, and wherein resetting the change bit and the reference bit prevents the first page from being swapped out of the system memory.

8. The computer program product of claim 7, wherein the program instructions to determine whether the page boundary of the first page has been crossed by a function further comprises program instructions to determine whether the function is executing an instruction that involves at least one function selected from the group consisting of referencing to another page and writing to another page.

9. The computer program product of claim 8, wherein the first page and the second page are singleton pages.

10. The computer program product of claim 7, wherein the program instructions to determine whether the page boundary of the first page has been crossed by a function which further comprises the program instructions to determine whether at least one of a reference bit and a change bit associated with another page has been set.

11. The computer program product of claim 7, wherein the program instructions to generate a hardware exception further comprises program instructions to transfer control of execution to an exception handler.

12. The computer program product of claim 7, further comprising:
based on determining that the page boundary has not been crossed by the function, program instructions to monitor execution of the function.

13. A computer system for optimizing usage of system memory, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to determine whether a page boundary of a first page has been crossed by a function to a second page;
based on determining that the page boundary has been crossed by the function, program instructions to generate a hardware exception; and
based on generating the hardware exception, program instructions to reset one or more of a change bit and a reference bit for the first page, wherein the reference bit, when set, indicates that the first page has been referenced; and wherein the change bit, when set, indicates that the first page has been written to, and wherein resetting the change bit and the reference bit prevents the first page from being swapped out of the system memory.

14. The computer system of claim 13, wherein the program instructions to determine whether the page boundary of the first page has been crossed by a function further comprises program instructions to determine whether the function is executing an instruction that involves at least one function selected from the group consisting of referencing to another page and writing to another page.

15. The computer system of claim 14, wherein the first page and the second page are singleton pages.

16. The computer system of claim 13, wherein the program instructions to determine whether the page boundary of the first page has been crossed by a function further comprises the program instructions to determine whether at least one of a reference bit and a change bit associated with another page has been set.

17. The computer system of claim 13, wherein the program instructions to generate a hardware exception further comprises program instructions to transfer control of execution to an exception handler.

18. The computer system of claim 13, further comprising:
based on determining that the page boundary has not been crossed by the function, program instructions to monitor execution of the function.

* * * * *